United States Patent [19]
Foerster

[11] 3,933,773
[45] Jan. 20, 1976

[54] THERMOPLASTIC ELASTOMERIC COPOLYMERS AND TERPOLYMERS OF TETRAFLUOROETHYLENE AND PROPYLENE AND METHOD OF MAKING THE SAME

[75] Inventor: Rolf F. Foerster, Lawrenceville, N.J.
[73] Assignee: Thiokol Corporation, Newtown, Pa.
[22] Filed: Dec. 6, 1973
[21] Appl. No.: 422,132

Related U.S. Application Data

[63] Continuation-in-part of Ser. No. 260,795, June 8, 1972, abandoned.

[52] U.S. Cl..... 260/87.5 B; 204/159.2; 260/23 XA; 260/30.6 R; 260/31.2 R; 260/32.8 AQ; 260/32.8 R; 260/33.4 F; 260/33.6 F; 260/33.8 F; 260/42.27; 260/45.75 A; 260/80.72; 260/80.76; 260/80.77; 260/80.8; 260/80.81; 260/900
[51] Int. Cl.² .................. C08F 2/32; C08F 214/26
[58] Field of Search ........ 260/87.5 B, 80.76, 80.77, 260/80.8, 80.72, 80.81; 450/722.5, 638.5

[56] References Cited
UNITED STATES PATENTS

| | | | |
|---|---|---|---|
| 2,436,069 | 2/1948 | Joyce | 260/80 |
| 2,468,664 | 4/1949 | Hanford et al. | 260/86 |
| 2,479,367 | 8/1949 | Joyce et al. | 260/87.5 |
| 3,306,879 | 2/1967 | Pattison | 260/77.5 |
| 3,380,974 | 4/1968 | Stilmar | 260/80.8 |
| 3,467,635 | 9/1969 | Brasen et al. | 260/80.76 |
| 3,579,474 | 5/1971 | Ro | 260/29.6 |
| 3,718,558 | 2/1973 | Tabata et al. | 204/159.2 |
| 3,723,270 | 3/1973 | Tabata et al. | 204/159.22 |

FOREIGN PATENTS OR APPLICATIONS

| | | | |
|---|---|---|---|
| 2,058,547 | 12/1972 | Germany | 260/87.5 B |
| 2,125,928 | 12/1971 | Germany | 260/87.5 B |

OTHER PUBLICATIONS
Journal of Polymer Science, 2, pp. 2235-2243, (1964).

*Primary Examiner*—Stanford M. Levin

[57] ABSTRACT

Thermoplastic elastomeric copolymers of tetrafluoroethylene and propylene and terpolymers of tetrafluoroethylene, propylene and a cure site monomer are disclosed which have a substantially uniform composition, i.e., a substantially uniform molar ratio of monomeric units and a relatively high molar ratio of tetrafluoroethylene units to propylene units within the range 1.0:0.11 to 1.0:0.54. The combination of high molar ratio of tetrafluoroethylene/propylene units, substantially uniform composition and good elastomeric properties is achieved by using a hybrid batch-/continuous process wherein a reactor is initially charged with a mixture of tetrafluoroethylene, propylene and, optionally, a cure site monomer having a TFE/propylene molar ratio substantially higher than that of the polymer to be produced, i.e., in the range 1.0:0.01 to 1.0:0.087. The polymerization reaction is then initiated and a mixture of the same monomers is fed to the reactor at such a rate and in such proportions as to maintain the molar ratio of the unreacted monomers substantially the same as that in the initial charge to the reactor.

8 Claims, No Drawings

THERMOPLASTIC ELASTOMERIC COPOLYMERS AND TERPOLYMERS OF TETRAFLUOROETHYLENE AND PROPYLENE AND METHOD OF MAKING THE SAME

This application is a continuation-in-part of copending application Ser. No. 260,795 filed June 8, 1972, now abandoned.

The invention relates to a novel process for preparing thermoplastic elastomeric copolymers of tetrafluoroethylene and propylene, as well as terpolymers of tetrafluoroethylene, propylene and copolymerizable cure site monomers, having a relatively high molar ratio of tetrafluoroethylene to propylene and a substantially uniform composition. Because of the fact that the process of the invention produces polymers of relatively uniform composition, it is possible to produce thereby novel copolymers which exhibit elastomeric properties at higher molar ratios of tetrafluoroethylene to propylene units than has heretofore been possible.

During the past decade elastomers processible by thermoplastic techniques have become of increasing commercial significance. They are being used in market areas which require some of their rather unique properties combined with the improved economics resulting from the simplified high speed processing techniques characteristic of the plastics industry. These thermoplastic elastomers are useful in a variety of applications. The thermoplastic elastomers of the prior art generally achieved their physical and chemical properties through a so-called "hard" segment which can be characterized as a thermally labile physical crosslink which softens and flows under shear upon heating, yet recovers its structure upon cooling. Thus the hard segment is analogous to the chemical crosslink of the thermosetting rubbers. Examples of this type of thermoplastic elastomer are the styrene-isoprene or styrene-butadiene type of block copolymer. More recently, efforts to produce thermoplastic elastomers have concentrated on copolymers of tetrafluoroethylene and various unsaturated monomers to take advantage of the known heat and chemical resistance of tetrafluoroethylene.

Copolymers of tetrafluoroethylene with ethylenically unsaturated monomers are known, and are disclosed, for example, in U.S. Pat. No. 2,468,664 and British Pat. No. 594,249. The specific copolymers exemplified in these patents and the properties disclosed indicate that when about one-half or more of the units present are derived from tetrafluoroethylene, the resultant copolymers are tough, non-resilient, high melting plastics. These patents also teach that when the tetrafluoroethylene units do not predominate, the resulting copolymers are low melting thermoplastic resins. It has been reported in the Journal of Polymer Science, Vol. 2, pages 2235–2243 (1964) that a copolymer of tetrafluoroethylene and propylene wherein the units derived from tetrafluoroethylene predominate exhibits a "rubberlike" character. However, this publication does not specifically define rubberlike as applied to such copolymers to include thermoplastic elastomers. Moreover, as shown in FIG. 7 at page 2240 of the Journal of Polymer Science article, the copolymers of tetrafluoroethylene and propylene disclosed therein contain a maximum of about 60 mole percent of units derived from tetrafluoroethylene, whereas the tetrafluoroethylene-propylene copolymers of the present invention contain a minimum of 65 mole percent, desirably 65 to 90 mole percent, of units derived from tetrafluoroethylene. Hence, the copolymers of the present invention are outside of the scope of the disclosure in the Journal of Polymer Science article.

More recently, elastomers based on copolymers and terpolymers of tetrafluoroethylene and certain olefinic compounds have been disclosed and claimed in U.S. Pat. No. 3,467,635. This patent discloses that polymers of tetrafluoroethylene with such olefins as ethylene, propylene, butylene and isobutylene, as well as a cure site monomer, if desired are or may be converted to elastomers. More specifically, this patent teaches that polymers which are convertible to elastomers contain tetrafluoroethylene units and olefin units in a molar ratio of about 1:0.6 to 1:1.2. This indicates that the copolymers of tetrafluoroethylene and propylene contain a maximum of about 62.5 mole percent of units derived from tetrafluoroethylene. The above-cited patent further teaches that the molar ratio referred to above must be observed in order to obtain polymers of tetrafluoroethylene and olefins which exhibit elastomer characteristics and that polymers containing higher ratios of tetrafluoroethylene to olefin are not elastomeric.

It has now been surprisingly and unexpectedly discovered that by using the novel process of the present invention it is possible to prepare copolymers of tetrafluoroethylene and propylene, as well as terpolymers of tetrafluoroethylene, propylene and a cure site monomer, containing a minimum of about 65 mole percent tetrafluoroethylene units and which exhibit elastomeric characteristics when cured, and even in some cases, in the gum or uncured state. Thus the copolymers and terpolymers of the present invention are distinctly different from the copolymers and terpolymers of the prior art. Moreover, the elastomers of the prior art have been found to be deficient in several respects, e.g., elasticity, processability and/or chemical resistance. The thermoplastic elastomers of the present invention have been found to exhibit satisfactory elastic and processing characteristics, as well as good chemical and heat resistance. Thus, for example, they can be used in the manufacture of heat and solvent resistant flexible tubing and hose or wire coatings. The thermoplastic elastomers can also be used in the manufacture of gaskets, O-rings, and other seals, or for diaphragms or components of fluid-handling equipment such as pumps, compressors, hydraulic systems, dry-cleaning machinery and the like.

The term "elastomer" as used in the present specification and claims refers to a material which, when stretched to twice its length at room temperature, held for one minute and then released retracts to less than 1.5 times its original length within one minute. This definition corresponds essentially to the definition of a rubber in ASTM Standards, Part 28 D1566 (1973). The amount by which the material fails to retract to its original length when subjected to this test is referred to below as "permanent set" and is expressed as a percentage of the original length.

Accordingly it is an object of the present invention to provide new thermoplastic elastomers having a high weight proportion of fluorine. It is another object of the invention to provide new thermoplastic elastomers based on copolymers of tetrafluoroethylene and propylene, and optionally cure site monomers, which contain high mole percentages of tetrafluoroethylene units, i.e., at least 65 mole percent tetrafluoroethylene units. It is a still further object of the invention to provide polymers having such a high content of tetrafluoroethylene units, which polymers are curable to elastomers having improved elasticity, processability and chemical resistance. It is a still further object of the invention to provide a novel process whereby such polymers can be prepared. Other objects of the invention will be apparent to those skilled in the art from the detailed description of a number of embodiments of the invention given below.

As conducive to a clearer understanding of the present invention, it may be pointed out that in the copolymerization of tetrafluoroethylene and propylene, as well as in the terpolymerization of tetrafluoroethylene, propylene and a cure site monomer, in most cases the monomers do not enter the copolymer in the same mole ratio as they are present in the monomer mixture. In this regard, the literature indicates that the best available values of the reactivity ratios for TFE and propylene are 0.01 and 0.1, respectively. These values indicate a high alternating tendency of the monomers, i.e., a polymer radical ending in a TFE unit will preferentially add a propylene monomer unit and conversely. Thus when a mixture containing a major amount (mole fraction) of TFE and a minor amount of propylene is polymerized, the copolymer will usually contain less TFE than the monomer mixture. For example, if a monomer mixture containing 60 mole percent of TFE and 40 mole percent of propylene is charged to the reactor, the average composition of the product may contain of the order of 55 mole percent of TFE units. As the TFE content of the monomer mixture charged to the reactor is increased, the difference between the TFE content of the feed and the TFE content of the product increases. Moreover, the TFE content of the initially formed copolymer is substantially below the average TFE content of the product formed at a conversion of say 10% to 15%. Thus a batch polymerization of tetrafluoroethylene and propylene produces a product which is of non-uniform composition, i.e., the TFE/propylene ratio of the copolymer formed increases substantially during the course of the reaction. The non-uniform copolymers thus produced have inferior elastomeric properties.

A similar effect is obtained when a conventional continuous process is employed. The copolymer initially formed has a TFE unit content substantially below that of the TFE content of the feed mixture. As the reaction proceeds, the TFE concentration of the reaction mixture increases relative to the propylene concentration thereof and copolymer chains are produced having increased proportions of TFE units. The final product obtained in such a continuous process may have an average ratio of TFE/propylene units approaching or equal to the TFE/propylene ratio of the feed mixture, but the product will still have a non-uniform composition.

Applicant has found that copolymers of tetrafluoroethylene and propylene, as well as terpolymers of tetrafluoroethylene, propylene and cure site units, of substantially uniform composition, a high fluorine content and improved elastomeric properties can be obtained by using a novel hybrid batch/continuous process. In accordance with applicant's process a polymerization reactor is initially charged with a mixture of tetrafluoroethylene and propylene, which may or may not contain a cure site monomer, and wherein the ratio of TFE/propylene is of the order of 1:0.01 to 1:0.087. The polymerization is then initiated and thereafter the reactor is fed, continuously or incrementally, with a monomer mixture having a TFE/propylene ratio within the range 1:0.11 to 1:0.54, preferably 1:0.25 to 1:0.43 and substantially equal to the TFE/propylene ratio in the polymer initially formed in the reactor. The feed mixture is introduced into the reactor at such a rate as to maintain the pressure within the reactor substantially constant to cause the monomers within the reactor to be replenished at approximately the same rate as they are consumed within the reactor. As shown in the Examples given below, the polymers thus produced have a substantially uniform composition, a TFE/propylene molar ratio in the range 1.0:0.11 to 1.0:0.54 and improved elastomeric properties.

In the case of copolymers of tetrafluoroethylene and propylene, the copolymers contain from 65 to 90 mole percent TFE units. The preferred copolymers contain from 70 to 80 mole percent TFE units, since such copolymers provide a good balance of physical and chemical properties and processing characteristics. The thermoplastic copolymers are useful as such for some applications or, as indicated in some of the Examples given below, they may be cross-linked to yield products having improved elastomeric properties.

The terpolymers of the invention may contain 0 to 10 mole percent, based on the total amount of monomeric units, of cure site units and like the copolymers desirably have a TFE/propylene unit ratio of 1.0:0.11 to 1.0:0.54. The preferred terpolymers have a TFE/propylene unit ratio of 1.0:0.25 to 1.0:0.43.

Monomers which are copolymerizable with tetrafluoroethylene and propylene to provide cure site units are known in the art and in general one or more of any of these known cure site monomers can be used in preparing the polymers of the present invention which contain such cure site units. Such cure site units are disclosed, for example, in U.S. Pat. No. 3,467,635 and the patents cited therein. As is known in the art, the cure site units are commonly olefinically unsaturated organic compounds having functional groups such as carboxyl, halogen, epoxy or nonpolymerizable olefinic groups through which the polymer can be cured in known manner. Typical cure site monomers are chloroethylvinyl ether, divinyl carbitol, vinyl chloroacetate, allyl chloroacetate, allyl glycidyl ether, and chloroethylacrylate.

In accordance with a preferred embodiment of the present process, the polymers of the invention are prepared by an emulsion polymerization utilizing a redox initiator system. A suitable reactor, e.g., a horizontally or vertically stirred reactor or closed autoclave is charged with an inert liquid medium, buffer, emulsifier, catalyst and reducing agent. As described above, the reactor is then charged with a monomer mixture have a sufficiently high concentration of tetrafluoroethylene to produce an initial polymer with the desired TFE/propylene unit ratio. The proportions of monomers required to produce an initial polymer of a given desired composition can be determined by a preliminary test at a low conversion. The polymerization is carried out at a temperature of 5°C. to 120°C., preferably 40°C. to 80°C., and at a pressure of 100 p.s.i.g. to 1000 p.s.i.g., preferably 250 to 350 p.s.i.g.

The polymerization is initiated by introduction of a suitable initiator into the reactor. When polymerization has started as indicated by a small pressure drop, a monomer feed mixture, having a composition corresponding substantially to that of the polymer initially formed within the reactor, is fed to the reactor continuously or incrementally whenever a small pressure drop of say 10 to 15 p.s.i.g. occurs in the reactor. In this way the monomers within the reactor are replenished at approximately the same rate as that at which they are consumed, thereby maintaining an essentially constant monomer composition and pressure in the reactor and producing a polymer of uniform composition. The polymerization reaction is terminated by venting the unreacted monomers, and the copolymer product is discharged and isolated using known methods.

In the emulsion or suspension polymerization used to produce the polymers of the present invention, conventional free-radical initiators, such as, for example, peroxides, azo compounds, metal and ammonium persulfates, permanganates, or peroxydiphosphates may be used as initiators. When an azo compound is employed, a water-soluble azonitrile is suitable, such as, for example, 4-tert-butylazo-4-cyanovaleric acid. Water-soluble organic peroxides, e.g., disuccinic acid peroxides can also conveniently be employed. The preferred initiators in the practice of the present invention are the alkali metal and ammonium persulfates. Water, lower alkanols, e.g., tertiary butyl alcohol, and trichlorotrifluoroethane may be employed as inert media, the latter in conjunction with organic soluble initiators, such as azo-bis-isobutyronitrile, benzoyl peroxide or tert-butyl peroxypivalate and tert-butyl peroxide. Deionized, deoxygenated water is the preferred medium. Emulsifiers which can advantageously be employed are the fluorocarbon or chlorfluorocarbon carboxylic acids or sulfonic acids or their alkali metal or ammonium salts or alkali metal or ammonium aliphatic alcohol sulfates. A preferred emulsifier in the present invention is ammonium perfluoro-n-octanoate. A buffer such as an alkali metal or ammonium hydroxide, carbonate, or phosphate may be used. Reducing agents which may conveniently be employed are the alkali metal sulfites or bisulfites. A preferred reducing agent is sodium sulfite. Other ingredients may optionally be employed; such as, for example, a modifier or chain transfer agent, e.g., hydrogen, a hydrocarbon or hydrocarbon derivative, an aliphatic or aromatic mercaptan, a primary, secondary or tertiary alcohol or a halogenated aliphatic or aromatic compound, a thickener, suspending agent, or protective colloid, such as polyvinyl alcohol or a polymer or copolymer of acrylic acid or maleic anhydride or their alkali metal or ammonium salts.

In order to point out more fully the nature of the present invention, the following Examples are given to illustrate applicant's novel process for making the copolymers and terpolymers of the invention and the novel properties of the products thus obtained.

EXAMPLE 1

Terpolymer of tetrafluoroethylene, propylene and 2-chlorovinyl ethyl ether in a molar ratio of 1.0/0.4/0.03

A stirred stainless steel reactor of 86 liter capacity was charged with 2860 g of tetrafluoroethylene, 96 g of propylene, 20.9 g of 2-chloroethyl vinyl ether, 64.5 liters of deionized water, 127.3 g of ammonium perfluorooctanoate, 193.9 g of anhydrous sodium carbonate, and 38.4 g of sodium sulfite. Thus the initial monomer ratio of tetrafluoroethylene (TFE), propylene (Pr), and 2-chloroethyl vinyl ether (CEVE), in mole percentages, was 92.0/7.4/0.6. Polymerization was initiated at 65°C. and 20 atm. gauge pressure by injecting a solution of 38.3 g of ammonium persulfate in 420 ml of water. The partial pressures of the gaseous monomers were maintained essentially constant by continuously feeding a mixture of TFE and propylene, 70.2/29.8 by mole, until a total of 12020 g of that gas mixture had been charged. During the same time period (12.8 hours), 387 g of CEVE was continuously pumped into the reactor at such a rate as to maintain the feed composition of TFE, propylene, and CEVE at 68.5/29.1/2.4 by mole. An additional 20 g of ammonium persulfate and 10 g of sodium sulfite (total) were charged, in four equal increments, as 5% aqueous solutions, over the reaction period. When the polymer content of the latex had reached 7.5%, another 129.3 g of ammonium perfluorooctanoate was added as a solution in 400 ml of water. Samples of latex were withdrawn periodically, and the composition of the isolated terpolymer was calculated from its carbon and chlorine analyses.

The results as set forth below showed excellent uniformity in the composition of the product, i.e., very narrow composition distribution.

| Sample No. | I | II | III |
|---|---|---|---|
| Time, hrs. | 2.7 | 9.1 | 12.8 |
| % Solids | 3.3 | 11.0 | 15.6 |
| % C | 33.26 | 33.32 | 33.26 |
| % H | 1.98 | 1.88 | 1.68 |
| % Cl | 1.04 | 1.01 | 0.89 |
| Mol % TFE | 69.7 | 69.6 | 69.8 |
| Mol % Propylene | 27.8 | 28.0 | 28.1 |
| Mol % CEVE | 2.5 | 2.4 | 2.1 |

It should also be noted that the polymer analyses were close to the monomer feed composition. In other words, although the composition of the terpolymer produced was quite different from the composition of monomer present in the reactor, both the monomer and polymer compositions were maintained essentially constant at all times by replenishing the monomers at the same rate and in the same molar ratio as they were consumed. Periodic monitoring of the gas phase composition by gas chromatography confirmed that the monomeric TFE content remained essentially constant at 92–95 mol %. At the final solids content of 15.6%, the polymer yield was 12350 g. The rubbery product was compounded with 20 p.h.r. (20 parts per hundred parts of rubber) of medium thermal carbon black (STERLING MT, G.L. Cabot, Inc.), 5 p.h.r. of dibasic lead phosphite (DYPHOS, NL Industries Inc.), 1 p.h.r. of stearic acid, and 1.3 p.h.r. of hexamethylenediamine carbamate (DIAK No. 1, E. I. du Pont de Nemours & Co.). Sheets were pressed out for 30 min. at 170°C., compression plugs for 45 min. at 170°C. This was followed by a stepwise postcure in an air oven 4 hours at 200°–400°F. and then 24 hours at 400°F. (204°C.). Physical properties of the cured rubber were as follows: Shore A hardness 80, 100% modulus 1115 p.s.i., tensile at break 2655 p.s.i., elongation 185%, permanent set after 100% extension 19%, permanent set at break 24%, compression set 41% after 22 hours at 400°F. Solvent swell (volume increase after immersion for one week) was determined to be as follows: Methanol (ambient temperature), 0%; Methyl ethyl ketone (ambient temperature), 43%; Tetrachloroethylene (ambient temperature), 15%; SKYDROL 500 A (Isooctyl diphenyl phosphate, a fire resistant hydraulic fluid manufactured by Monsanto Chemical Co.; 250°F.), 15%; ASTM Oil No. 3 (250°F.), 2%.

EXAMPLE 2

Terpolymer of tetrafluoroethylene, propylene and 2-chloroethyl vinyl ether in a molar ratio of 69.5/28.4/2.1

Another run was carried out substantially as in Example 1. The mole ratio of the gaseous monomers in the reactor, as monitored by gas chromatography, was maintained at a steady-state value of about 94.6/5.4 with respect to tetrafluoroethylene and propylene. The feed mixture was maintained at a mole ratio of 69.2/28.3/2.5 with respect to TFE, propylene and 2-chloroethyl vinyl ether, and the average (cumulative) terpolymer composition was 69.5/28.4/2.1 by mole. Samples were taken periodically of the latex and of the gas phase. Analytical results were as follows:

| Sample No. | I | II | III |
|---|---|---|---|
| Time, hrs. | 1.4 | 7.1 | 12.3 |
| % Solids in Latex | 1.9 | 9.5 | 14.0 |
| Mol % TFE | 68.8 | 68.7 | 69.5 |
| Mol % Propylene | 28.2 | 28.8 | 28.4 |
| Mol % CEVE | 3.0 | 2.5 | 2.1 |
| Gas Samples | | | |
| Mol % TFE | 94.58 | 94.67 | 94.62 |
| Mol % Propylene | 5.42 | 5.33 | 5.38 |

These data again demonstrate remarkable constancy of monomer and terpolymer compositions over the duration of the experiment, and thus assure excellent product uniformity.

EXAMPLE 3

Terpolymer of tetrafluoroethylene, propylene and 2-chloroethyl vinyl ether at a mole ratio of 1.0/0.466/0.042

A terpolymer containing 66.4 mol % TFE, 30.9 mol % propylene, and 2.8 mol % 2-chloroethyl vinyl ether was prepared in a manner similar to that described in Example 1, except that the initial mole ratio of TFE, propylene and CEVE in the reactor was 90.9/8.6/0.5 and the subsequent feed ratio was 66.4/31.1/2.5. The reaction was carried out at a temperature of 152°F. and a pressure of about 330 p.s.i.g. for approximately twelve hours. Initiator solutions containing a total of 45.9 g of sodium sulfite and 53.3 g of ammonium persulfate were injected over that period. Samples of the latex were withdrawn periodically and analyzed until the final solids content of 15.4% had been reached. The results of the analyses were as follows:

| Sample No. | I | II | III |
|---|---|---|---|
| Time, hrs. | 2.35 | 7.4 | 11.7 |
| % Solids | 2.25 | 9.0 | 15.4 |
| Mol % TFE | 67.8 | 65.6 | 66.4 |
| Mol % Propylene | 29.7 | 31.9 | 31.0 |
| Mol % CEVE | 2.5 | 2.5 | 2.6 |

The final product was compounded with 20 p.h.r. of STERLING MT, 5 p.h.r. of DYPHOS, 1 p.h.r. of stearic acid, and 1.3 p.h.r. of DIAK No. 1 and cured as in Example 1. Physical properties were as follows: Tensile strength, 2200 p.s.i.; Elongation, 240%; 100% Modulus, 560 p.s.i.; Shore A hardness, 73; Permanent set after 100% extension, 7%; Compression set after 22 hours at 400°F., 26%. Solvent swell (volume increase after immersion for one week) was determined to be as follows: Butyl acetate (ambient temperature), 83%; Tetrachloroethylene (ambient temperature), 27%; SKYDROL 500 A (Isooctyl diphenyl phosphate, a fire resistant hydraulic fluid manufactured by Monsanto Chemical Co.; 300°F.), 31%; ASTM Oil No. 3 (300°F.), 15%.

EXAMPLE 4

Terpolymer of tetrafluoroethylene, propylene and 2-chloroethyl vinyl ether at a molar ratio of 1.0/0.43/0.03

A terpolymer containing 68.5 mol % TFE, 29.4 mol % propylene, and 2.1 mol % 2-chloroethyl vinyl ether was prepared similarly as described in Example 1, except that the initial mole ratio of TFE, propylene and CEVE in the reactor was 93.2/6.35/0.45 and the subsequent feed ratio was 68.0/29.5/2.5. The reaction was carried out at a temperature of 152°F. and a pressure of about 290 p.s.i.g. for 14 hours. Iniator solutions containing a total of 48.4 g of sodium sulfite and 58.3 g of ammonium persulfate were injected over that period. Samples of the latex were withdrawn periodically and analyzed until the final solids content of 15% had been reached. The results of the analyses were as follows:

| Sample No. | I | II | III |
|---|---|---|---|
| Time, hrs. | 2.4 | 7.3 | 14.0 |
| % Solids | 1.75 | 8.4 | 15.0 |
| Mol % TFE | 68.5 | 69.0 | 68.5 |
| Mol % Propylene | 29.7 | 28.9 | 29.4 |
| Mol % CEVE | 1.8 | 2.1 | 2.1 |

The final product was compounded with 20 p.h.r. of STERLING MT, 5 p.h.r. of DYPHOS, 1 p.h.r. of stearic acid, and 1.3 p.h.r. of DIAK No. 1 and cured as in Example 1. Physical properties were as follows: Tensile strength, 2185 p.s.i.; Elongation, 220%; 100% Modulus, 700 p.s.i.; Shore A hardness, 75; Compression set after 22 hours at 400°F., 29%; Permanent set after 100% extension, 8%. Solvent swell (volume increase after immersion for one week) was determined to be as follows: Butyl acetate (ambient temperature), 66%; Tetrachloroethylene (ambient temperature), 21%, SKYDROL 500 A (Isooctyl diphenyl phosphate, a fire resistant hydraulic fluid manufactured by Monsanto Chemical Co.; 300°F.), 26%; ASTM Oil No. 3 (300°F.), 13%.

EXAMPLE 5

Terpolymer of tetrafluoroethylene, propylene and 2-chloroethyl vinyl ether at a molar ratio of 1.0/0.32/0.58

A terpolymer containing 72.7 mol % TFE, 23.1 mol % propylene, and 4.2 mol % 2-chloroethyl vinyl ether was prepared in a manner similar to that described in Example 1, except that the initial mole ratio of TFE, propylene and CEVE in the reactor was 94.1/4.9/1.0 and the subsequent feed ratio was 69.5/25.5/5.0. The reaction was carried out at a temperature of 151°F. and a pressure of about 305–325 p.s.i.g. for 10.5 hours. Initiator solutions containing a total of 63.4 g of sodium sulfite and 88.3 g of ammonium persulfate were injected over that period. Samples of the latex were withdrawn periodically and analyzed until the final solids content of 17% had been reached. The results of the analyses were as follows:

| Sample No. | I | II | III |
|---|---|---|---|
| Time, hrs. | 1.0 | 3.6 | 9.6 |
| % Solids | 3.8 | 9.6 | 17.0 |
| Mol % TFE | 74.2 | 74.8 | 72.5 |
| Mol % Propylene | 21.6 | 21.9 | 23.4 |
| Mol % CEVE | 4.2 | 3.3 | 4.1 |

The final product was compounded with 5 p.h.r. of DYPHOS and 1 p.h.r. of DIAK No. 1. Flexible sheets were pressed out at 350°F. for 30 minutes and post-cured for 24 hours at up to 200°C. (392°F.). Physical properties were as follows: Tensile strength, 2110 p.s.i.; Elongation, 170%; 100% Modulus, 1060 p.s.i.; Permanent set after 100% extension, 9%.

Solvent swell (volume increase after immersion for one week) was determined to be as follows: Ethyl acetate (ambient temperature), 73%; Tetrachloroethylene (ambient temperature), 2%; SKYDROL 500 A (Isooctyl diphenyl phosphate, a fire resistant hydraulic fluid manufactured by Monsanto Chemical Co.; 250°F.), 19%.

EXAMPLE 6

Copolymer of tetrafluoroethylene and propylene in a molar ratio of 76/24

A 20 liter horizontal autoclave was charged with 15 liters of deionized water, 75 grams of ammonium perfluorooctanoate, 75 grams of sodium hydroxide, and 3 g. of sodium sulfite. The reactor was evacuated, purged with nitrogen, and re-evacuated. Then 458 g. of tetrafluoroethylene and 8 g. of propylene was charged, and the reactor was heated to 60°C. Then a solution of 6 g. of ammonium persulfate in 100 ml. of water was injected. The polymerization was carried out at a pressure of 240–250 p.s.i.g. An essentially constant pressure and monomer composition was maintained by feeding a mixture of TFE and propylene, 75/25 by mole, whenever a pressure drop of 10 p.s.i. had occurred. The monomer composition was monitored by gas chromatography, using a column packed with a styrene-divinyl benzene resin (PORAPAK Q). The rate of reaction was determined from the rate of pressure drop in the reactor and weight loss of the monomer reservoir. After 4.75 hrs., when 1,600 g. of the 75/25 TFE/propylene gas mixture had been fed, the reaction was terminated by venting the unreacted monomer and discharging the polymer dispersion. The rubbery product was coagulated, washed and dried. The yield was 1,653 g. of copolymer, which was analyzed to contain 31.4% carbon and 1.5% hydrogen. Thus the product contained about 88% TFE by weight, or 76 mol % TFE. The material could be compounded on a rubber mill. Samples of the gum stock were pressed out into sheets at 175°–250°C. and 8,000 lbs. pressure or extruded at 250°–325°C. through a screwtype extruder. Physical properties and resistance to solvents, fuels, lubricants, and hydraulic fluids of this Example and Examples 7 and 8 are shown in Table I below. A specimen immersed in 90% nitric acid for 4 weeks showed no signs of deterioration. The preparation was repeated, except that the pressure was 325–335 p.s.i.g. at 60°C., and the reaction time was 4.5 hrs. The product (1,542 g. yield) was found to contain about 75 mol % tetrafluoroethylene (i.e., 87% by weight) and 26 mol % propylene (13% by weight) from the following elemental analysis: Carbon, 31.90%; Hydrogen, 1.93%; Fluorine, 66.09%.

EXAMPLE 7

Copolymer of tetrafluoroethylene and propylene in a molar ratio of 69/31

Another copolymerization was carried out substantially as in Example 3, except that the initial monomer charge consisted of 456 g. TFE and 10 g. propylene, and 1,400 g. of a 65/35 mixture (by mole) of TFE and propylene was fed incrementally over a period of 6.75 hrs. at 55°–60°C. and 270–280 p.s.i.g. The product was 1,527 g. of a rubbery copolymer containing about 69 mol % TFE. Properties of the product of this Example are compiled in Table I below.

EXAMPLE 8

Copolymer of tetrafluoroethylene and propylene in a molar ratio of 83/17

Another copolymerization was carried out substantially as in Example 6, except that the initial monomer charge consisted of approximately 466 g. TFE and 4 g propylene, and 1,600 g. of an 80/20 mixture (by mole) of TFE and propylene was fed incrementally over a period of 4.8 hours at 60°–65°C. and 300–310 p.s.i.g. The product was 1,511 g. of a tough rubbery copolymer containing about 83 mole % TFE. Properties are given in Table I below.

Table I

| "Gum Stock Properties of TFE-Propylene Copolymers (Uncured)" Example No. | 6 | 7 | 8 |
|---|---|---|---|
| TFE Content, mole % | 76 | 69 | 83 |
| Tensile Strength, psi. | 1590 | 860 | 2030 |
| Elongation, % | 360 | 490 | 230 |
| 100% Modulus, psi | 650 | 150 | 1275 |
| Duro (Shore A) | 91 | 63 | 92 |
| Solvent Swell (Volume Increase) | | | |
| Acetone (7 days, 77°F.) | 24 | 35 | 9 |
| Toluene (7 days, 77°F.) | 14 | 14 | 0 |
| ESSO EXTRA (7 days, 77°F.) | 13 | 12 | 0 |
| Tetrachloroethylene (7 days, 77°F.) | 11 | 22 | −2 |
| Butyl Acetate (7 days, 77°F.) | 24 | 60 | 3 |
| Styrene (7 days, 77°F.) | — | 6 | — |
| ASTM Oil No. 3 (7 days, 300°F.) | — | −16 | — |
| SKYDROL 500A (Isooctyl diphenyl phosphate) (7 days, 300°F.) | 0 | −17 | — |

By comparison, an uncured 51/49 TFE/propylene copolymer had the following physical properties (gum stock):

| Tensile Strength, psi | 430 |
|---|---|
| Elongation, % | 670 |
| Duro (Shore A) | 53 |
| 100% Modulus, psi | 140 |

Copolymers containing about 50 mol % of propylene swelled approximately 50–60% in toluene or high-octane fuel (ESSO EXTRA) and over 70% in tetrachloroethylene within 24 hours. Some specimens disintegrated completely on prolonged immersion in solvents, particularly acetone or ethyl acetate. All 50/50 copolymers were completely soluble in a mixture of acetone and $CCl_2FCClF_2$ (50/50 b.v.), whereas most of the polymers of higher TFE content could not be dissolved.

EXAMPLES 9 TO 11

Copolymers of tetrafluoroethylene and propylene in molar ratios of 69/31, 76/24, 83/17

These Examples illustrate the heat resistance of the copolymers of the present invention. In these Examples, samples of TFE/propylene copolymers containing 69, 76 and 83 mole percent TFE, respectively, were prepared in accordance with the procedure described in Example 6 and aged at 400°F. for a period of up to 6 months to determine the effect of heat aging on the physical properties of the copolymers. Test results are shown in Table II.

mol % of propylene, to approximately 300 p.s.i.g. at 145°F. Polymerization was initiated by injecting 31.4 g of ammonium persulfate and 31.1 g of sodium sulfite as separate, approximately 6% aqueous solutions. As the polymerization proceeded, the pressure in the reactor was maintained essentially constant by continuously feeding a gas mixture containing 76 mol % TFE and 24 mol % propylene until the polymer solids content of the latex was about 22%. The feed composition of 76/24 by mole was chosen so as to replenish each of the monomers in the reactor at approximately the same rate and in the same mole ratio as they were being consumed, since separate experiments had established that the Table II

| Example No. | 9 | 10 | 11 | 9 | 10 | 11 | 9 | 10 |
|---|---|---|---|---|---|---|---|---|
| TFE/$C_3H_6$*Copolymer Composition (mole %) | 69/31 | 76/24 | 83/17 | 69/31 | 76/24 | 83/17 | 69/31 | 76/24 |
| Test Conditions | Unaged Originals | | | Aged 4 Weeks at 400°F. | | | Aged 6 Months at 400°F. | |
| Physical Properties** | | | | | | | | |
| Tensile, psi | 850 | 1600 | 1950 | 1030 | — | 1350 | 575 | 1570 |
| Modulus, 100% | 150 | 650 | 1835 | 92 | — | 1335 | 100 | 340 |
| Modulus, 300% | 305 | 1330 | — | — | — | — | 135 | 750 |
| Elongation, % | 490 | 360 | 115 | 625 | — | 100 | 645 | 495 |
| Durometer, Shore A | 63 | 91 | 94 | 55 | — | 93 | 49 | 83 |
| % Permanent Set at Break | — | — | — | 30 | — | 38 | 43 | — |

*Uncured Copolymers
**Physical Property Values are based on an average of at least 3 specimens.

The data above indicate that the copolymers of the present invention maintain their physical properties relatively well under severe heat aging conditions.

EXAMPLES 12-13

Copolymers of tetrafluoroethylene and propylene in molar ratios of 69/31 and 76/24

These Examples illustrate the electrical properties of the thermoplastic elastomers of the present invention. In these Examples, copolymers of TFE/propylene containing 69 mole % and 76 mole % of tetrafluoroethylene, respectively, prepared as indicated in Examples 6 and 7, were tested for electrical properties. Test results were as follows:

| Example No. | 12 | 13 |
|---|---|---|
| Copolymer TFE/Propylene (Mole % ratio) | 69/31 | 76/24 |
| Dissipation Factor (1 mc) | 0.0346 | 0.0367 |
| Dielectric Constant (1 mc) | 2.25 | 2.44 |
| Arc Resistance, Seconds | 82.6 | 124 |
| Dielectric Strength (volts/mil) | 243 | 280 |
| Volume Resistivity (ohm-cm) | $1.6 \times 10^{14}$ | $2.9 \times 10^{14}$ |
| Surface Resistivity (ohm) | $1.6 \times 10^{14}$ | $1.6 \times 10^{14}$ |

The above data indicate that the copolymers of the present invention exhibit satisfactory electrical properties.

EXAMPLE 14

Copolymer of tetrafluoroethylene and propylene in a molar ratio of 76/24

A stirred stainless steel reactor of 86 liter capacity was charged to 75% of its volume with deionized water (64.5 l) containing about 0.5 p.p.h. of technical grade ammonium perfluorooctanoate (3M Brand Fluorochemical Surfactant FC-126, Minnesota Mining & Mfg. Co.; 319 g) and 0.5 p.p.h. of sodium hydroxide (319 g). The reactor was sealed, flushed with nitrogen, evacuated, and then pressurized with a gas mixture containing 99.0 mol % of tetrafluoroethylene and 1.0 mol % of propylene, to approximately 300 p.s.i.g. at 145°F. Polymerization was initiated by injecting 31.4 g of ammonium persulfate and 31.1 g of sodium sulfite as separate, approximately 6% aqueous solutions. As the polymerization proceeded, the pressure in the reactor was maintained essentially constant by continuously feeding a gas mixture containing 76 mol % TFE and 24 mol % propylene until the polymer solids content of the latex was about 22%. The feed composition of 76/24 by mole was chosen so as to replenish each of the monomers in the reactor at approximately the same rate and in the same mole ratio as they were being consumed, since separate experiments had established that the 99/1 monomer mixture originally charged would produce a copolymer with an initial composition of about 76/24. The product was isolated by coagulation of the latex, filtering, washing and drying. Analysis indicated a copolymer composition of 76.5 mol % TFE and 23.5 mol % propylene. The thermoplastic, rubbery material appeared to be highly homogeneous.

This material was blended with another batch of material made in a similar run and the blend was molded to produce practically colorless, transparent, flexible sheets by subjecting it to a pressure of 700 p.s.i. at 325°F. for 15 minutes. Some specimens from these sheets were tested in the original form; i.e., not crosslinked. The remainder of the sheets were exposed to gamma-radiation from a cobalt-60 source for 7.5 hours, at an average dose rate of about 2.2 megarads per hour, at ambient temperature, in a nitrogen atmosphere. Properties before and after irradiation are tabulated below.

The irradiated polymer showed significantly improved modulus retention, dimensional stability, elastic recovery, and compression-set resistance at elevated temperatures (up to about 400°F.). It also offered greatly improved resistance to stress cracking in hot oil; e.g., ASTM Oil No. 3 at 250°F.

| | Original | Irradiated |
|---|---|---|
| Tensile strength, p.s.i. | 2400 | 2470 |
| Elongation, % | 395 | 275 |
| Hardness, Shore A | 95 | 97 |
| 100% Modulus, p.s.i. | 890 | 1045 |
| 200% Modulus, p.s.i. | 1125 | 1450 |
| 300% Modulus, p.s.i. | 1675 | — |
| Permanent set after 100% extension, % | 43 | 48 |
| Permanent set after break, % | 310 | 180 |
| Compression set after 22 hrs. at 250°F. | 87 | 27 |
| Solvent Swell (Volume increase after one week at room temperature, %) | | |
| Butyl Acetate | 8 | 9 |

| | Original | Irradiated |
|---|---|---|
| Toluene | 4 | 2 |
| Tetrachloroethylene | 4 | 1 |
| Properties after heat aging in air for one week at 450°F. | | |
| Tensile strength, p.s.i. | 2790 | 2280 |
| Elongation, % | 425 | 285 |
| 100% Modulus, p.s.i. | 760 | 995 |
| 200% Modulus, p.s.i. | 925 | 1350 |
| 300% Modulus, p.s.i. | 1405 | — |
| Permanent set after break, % | 400 | 200 |

EXAMPLE 15

Copolymer of tetrafluoroethylene and propylene in a molar ratio of 1.0/0.397

A copolymer containing 71.6 mol % TFE and 28.4 mol % propylene was prepared in a manner similar to that described in Example 11, except that a mixture of TFE and propylene, about 70/30 by mole, was continuously fed to a reactor which had initially been charged with TFE and propylene in a mole ratio of slightly under 99/1. The copolymer was pressed into sheets, which were then exposed to gamma-radiation from a cobalt-60 source at dosages of 5 and 17 megarads, respectively. Properties were as follows:

| | Original | Irradiated (5 Mr) | Irradiated (17 Mr) |
|---|---|---|---|
| Tensile strength, p.s.i. | 1355 | 1820 | 2005 |
| Elongation, % | 440 | 400 | 280 |
| Hardness, Shore A | 86 | 87 | 88 |
| 100% Modulus, p.s.i. | 370 | 390 | 540 |
| 200% Modulus, p.s.i. | 475 | 540 | 900 |
| 300% Modulus, p.s.i. | 725 | 890 | — |
| 400% Modulus, p.s.i. | 1200 | 1820 | — |
| Permanent set*, % | 12 | 13 | 7 |

*After 100% extension, measured within one minute after release

EXAMPLE 16

Terpolymer of tetrafluoroethylene, propylene and diethylene glycol divinyl ether at a molar ratio of 1.0/0.41/0.044

A 20 liter reactor was charged with 420 g of tetrafluoroethylene, 4.0 g of propylene, and 45 g of diethylene glycol divinyl ether, representing an initial monomer mole ratio of 91.7/2.1/6.2, in an emulsion system containing 30 g of ammonium perfluorooctanoate and 45 g of sodium carbonate in 15 l of deionized water. The reactor was heated to 60°C. and 7.5 g of sodium sulfite and 15 g of ammonium persulfate were injected, as separate solutions, in 50 ml of water each. As the polymerization progressed, 1700 g of a gas mixture containing about 1400 g of tetrafluoroethylene and 300 g of propylene was fed continuously over a 3.5-hour period, and two more increments of 45 g each of diethylene glycol divinyl ether were added during that time. The overall mole ratio of the monomers charged was 69.0/27.8/3.2. Coagulation of the latex yielded 1815 g of polymer. Analysis of the product was consistent with an approximate composition of 69 mol % TFE, 28 mol % propylene, and 3 mol % of diethylene glycol divinyl ether; calc. 34.50% C, 2.46% H, 61.36% F, and 1.68% O; found 34.46% C, 2.15% H, and 60.10% F. A tough, flexible, partially crosslinked sheet was prepared by subjecting the material to hydraulic pressure for 30 minutes at 100°C. The Shore A hardness was 97, the tensile strength 1145 p.s.i., the elongation 90%, and the permanent set at break 32%.

EXAMPLE 17

Copolymerization of tetrafluoroethylene, propylene and diethylene glycol divinyl ether at a monomer mole ratio of 92/5/3

A terpolymer was prepared in a manner similar to that described in Example 16, except that the initial composition of the monomer mixture in the reactor was 92 mol % TFE, 5 mol % propylene and 3 mol % diethylene glycol divinyl ether and a gaseous mixture of 68 mol % TFE and 32 mol % propylene was fed continuously. Analysis indicated that the copolymer contained approximately 69 mol % TFE (33.85% C, 2.80% H, and 64.12% F). The rubbery polymer was milled with 30 p.h.r. of medium thermal carbon black, 2 p.h.r. of m-phenylene dimaleimide, and 4 p.h.r. of 45% 2,5-di(tert-butylperoxy)hexane, press-cured for 30 minutes at 180°-185°C., and postcured stepwise for 6 hours at 50°C. to 204°C. followed by 24 hours at 204°C. The cured elastomer had the following physical properties: Tensile strength, 1560 p.s.i.; Elongation, 200%; 100 % Modulus, 1180 p.s.i., Shore A hardness, 81; Permanent set at break, 4%; Compression set after 22 hours at 300°F. 65%. Solvent swell (volume increase after one week at room temperature) was found to be as follows: Acetone, 23%; Toluene, 14%; High-octane gasoline (EXXON EXTRA), 5%; Tetrachloroethylene, 8%; Butyl acetate, 26%.

EXAMPLE 18

Terpolymer of tetrafluoroethylene, propylene and vinyl chloroacetate

A 20 liter autoclave was charged with 528 g of tetrafluoroethylene, 4.75 g of propylene and 20 g of vinyl chloroacetate in an emulsion system containing 15 l of deionized water, 30 g of ammonium perfluorooctanoate, and 30 g of tribasic sodium phosphate dodecahydrate. The initial monomer ratio in the reactor was 95.0/2.0/3.0 by mole. Polymerization was initiated at 60°C. and 300 p.s.i.g. by injecting 9 g of sodium sulfite and 18 g of ammonium persulfate in 100 ml of water each. As the reaction proceeded, the pressure was maintained at 300 p.s.i.g. by continuously feeding a mixture of TFE and propylene, 71/29 by mole. When 300 g of that mixture had been fed, another 12 g of vinyl chloroacetate was added, followed by continuous feed of another 300 g of the TFE/propylene mixture. Then the unreacted gaseous monomers were discharged, and 646 g of polymer was isolated by coagulation of the latex. Analysis showed the product to contain 77.3 mol % TFE, 22.5 mol % propylene, and 0.2 mol % vinyl chloroacetate. The tough rubbery polymer was compounded and cured with 1.3 p.h.r. of hexamethylenediamine carbamate and 5 p.h.r. of dibasic lead phosphite. The tensile strength was 1170 p.s.i., the elongation at break, 345%, and the Shore A hardness, 90.

EXAMPLE 19

Copolymer of tetrafluoroethylene and propylene in a molar ratio of 1.0/0.26

A copolymer containing 79.1 mol % of tetrafluoroethylene and 20.9 mol % of propylene was prepared substantially as described in Example 14, except that after the initial monomer charge of 99.0 mol % of TFE and 1.0 mol % propylene a mixture of about 77 mol % TFE and 23 mol % propylene was used for the continuous feed. The polymerization was carried out at a temperature of 142°–148°F. and a pressure of about 305–315 p.s.i.g. At the end of nine hours, a dispersion containing 15.6% polymer was obtained. The isolated product was pressed into flexible sheets having a tensile strength of 2620 p.s.i., an elongation at break of 400%, a Shore A hardness of 89, a 100% modulus of 530 p.s.i., and a permanent set value after 100% extension of 40%.

EXAMPLE 20

Copolymer of tetrafluoroethylene and propylene at a molar ratio of 1.0/0.325

A 20 liter autoclave was charged with 15 l of deionized water, 75 g of ammonium perfluorooctanoate, 75 g of sodium hydroxide, and 3 g of sodium sulfite. The reactor was sealed, purged with nitrogen, and evacuated. It was then pressurized to 40 p.s.i.g. at ambient temperature with a mixture of TFE and propylene, 73/27 by mole. 400 g of pure, inhibitor-free TFE was then added to bring the TFE/propylene mole ratio in the reactor to about 95.5/4.5 and the reactor heated to about 60°C. Polymerization was initiated by injecting a solution of 6 g ammonium persulfate in 100 ml of water. As the reaction proceeded, a mixture of TFE and propylene, 73/27 by mole, was fed in a semi-continuous manner so as to maintain the reaction pressure at 310–325 p.s.i.g.. During a period of 4.8 hours, 1600 g of that gas mixture was charged. After releasing the pressure, the latex was discharged and coagulated, yielding 1396 g of a copolymer containing about 75.5 mol % TFE and 24.5 mol % propylene (elemental analysis: 31.37% C, 1.65% H, and 64.63% F). Flexible sheets pressed from this product had the following properties: Tensile strength, 1820 p.s.i.; Elongation, 410%, Shore A hardness, 86; 100% Modulus, 460 p.s.i.; Permanent set after 100% extension, 24%. Solvent swell (volume increase after immersion for one week): Acetone 17%; Butyl acetate, 21%; Tetrachloroethylene, 8%; High-octane gasoline (EXXON EXTRA), 8%; Toluene, 8%.

From the foregoing discussion and Examples it should be evident that applicant has disclosed a novel process for making a novel group of thermoplastic elastomeric polymer which, because of their relatively high fluorine content exhibit improved solvent resistance, and because of their more nearly uniform composition in terms of TFE/propylene molar ratio exhibit improved elastomeric properties. It is, of course, to be understood that the foregoing Examples are intended to be illustrative only and that numerous changes in the ingredients, proportions and conditions disclosed can be made without departing from the spirit of the invention as defined in the appended claims.

I claim:

1. In a process for copolymerizing tetrafluoroethylene and propylene in an emulsion polymerization reaction mixture in a reactor at a temperature of 5° to 120°C. and at a pressure of 100 to 1,000 p.s.i.g., the improvement which consists in initially charging said reactor with an emulsion polymerization reaction mixture consisting essentially of tetrafluoroethylene and propylene in a molar ratio of 1.0:0.01 to 1.0:0.087, adding an initiator to said mixture to cause said tetrafluoroethylene and propylene to form an initial copolymer having a molar ratio of tetrafluoroethylene units to propylene units of at least 1.0:0.54 and thereafter continually feeding to said reactor a monomer mixture having a molar ratio of tetrafluoroethylene to propylene that is substantially the same as the ratio of tetrafluoroethylene units to propylene units in the initially formed copolymer within the reactor and at a feed rate to maintain the reactor pressure substantially constant to cause the monomers within the reactor to be replenished at approximately the same rate as they are consumed in the polymerization reactor and thereby produce a copolymer having a molar ratio of tetrafluoroethylene units to propylene units of from 1.0:0.11 to 1.0:0.54.

2. In a process for preparing a terpolymer of tetrafluoroethylene, propylene and a cure site monomer in an emulsion polymerization reaction mixture in a reactor at a temperature of 5° to 120°C. and a pressure of 100 to 1,000 p.s.i.g., the improvement which consists in initially charging said reactor with an emulsion polymerization reaction mixture consisting essentially of tetrafluoroethylene and propylene in a molar ratio of 1.0:0.01 to 1.0:0.087 and up to 10 mole percent of a cure site monomer, adding an initiator to said mixture to cause said tetrafluoroethylene, propylene and cure site monomer to form an initial terpolymer having a molar ratio of tetrafluoroethylene units to propylene units of at least 1.0:0.54, thereafter continually feeding to said reactor a monomer mixture of tetrafluoroethylene, propylene and cure site units in a molar ratio that is substantially the same as the ratio of tetrafluoroethylene units, propylene units and cure site units in the initially formed copolymer within the reactor and at a feed rate to maintain the reactor pressure substantially constant to cause the monomers within the reactor to be replenished at approximately the same rate as they are consumed in the polymerization reaction and thereby produce a copolymer having a molar ratio of tetrafluoroethylene units to propylene units of from 1.0:0.11 to 1.0:0.54.

3. An elastomer consisting essentially of a copolymer of tetrafluoroethylene and propylene having a molar ratio of tetrafluoroethylene units to propylene units of from 1.0 : 0.11 to 1.0 : 0.54 and made by the process of claim 1.

4. An elastomer consisting essentially of a terpolymer of tetrafluoroethylene, propylene and a cure sits monomer having a molar ratio of tetrafluoroethylene units to propylene units of from 1.0 : 0.11 to 1.0 : 0.54 and made by the process of claim 2.

5. The process as claimed in claim 1 wherein the reaction temperature is from 40°C. to 80°C.

6. The process as claimed in claim 2 wherein the reaction temperature is from 40°C. to 80°C.

7. The process as claimed in claim 1 wherein the reaction pressure is from 250 to 350 p.s.i.g.

8. The process as claimed in claim 2 wherein the reaction pressure is from 250 to 350 p.s.i.g.

* * * * *